US007887070B2

(12) United States Patent  (10) Patent No.: US 7,887,070 B2
Kirchner  (45) Date of Patent: Feb. 15, 2011

(54) VEHICLE WHICH CAN TILT IN TURNS, IN PARTICULAR TRICYCLE

(75) Inventor: Hubert Kirchner, Bernau (DE)

(73) Assignee: Multi Display Werbeagentur & Werbewerstatt Guenther Wagner, Bernau (DE)

( * ) Notice: Subject to any disclaimer, the term of this patent is extended or adjusted under 35 U.S.C. 154(b) by 203 days.

(21) Appl. No.: 12/279,065

(22) PCT Filed: Feb. 12, 2007

(86) PCT No.: PCT/EP2007/051350

§ 371 (c)(1), (2), (4) Date: Oct. 7, 2008

(87) PCT Pub. No.: WO2007/093579

PCT Pub. Date: Aug. 23, 2007

(65) Prior Publication Data

US 2009/0315282 A1  Dec. 24, 2009

(30) Foreign Application Priority Data

Feb. 13, 2006 (DE) .................. 10 2006 007 613
Dec. 28, 2006 (DE) .................. 10 2006 062 678
Dec. 28, 2006 (DE) .................. 20 2006 019 783 U

(51) Int. Cl.
    *B60G 21/00* (2006.01)
(52) U.S. Cl. ................. 280/124.103; 280/282
(58) Field of Classification Search ........ 280/124.103, 280/282; 180/210
    See application file for complete search history.

(56) References Cited

U.S. PATENT DOCUMENTS

| 4,469,344 | A | * | 9/1984 | Coil ..................... 280/269 |
| 4,624,469 | A | * | 11/1986 | Bourne, Jr. .............. 280/62 |
| 4,740,004 | A | * | 4/1988 | McMullen .............. 280/269 |
| 4,903,857 | A | * | 2/1990 | Klopfenstein ........... 280/267 |
| 4,993,733 | A | | 2/1991 | Eilers |
| 5,209,506 | A | * | 5/1993 | Klopfenstein ........... 280/240 |
| 5,536,029 | A | | 7/1996 | Gramckow |
| 5,762,351 | A | * | 6/1998 | SooHoo ................. 280/267 |

(Continued)

FOREIGN PATENT DOCUMENTS

DE  10249616 A1  8/2003

(Continued)

OTHER PUBLICATIONS

English Language Abstract for DE 102 49 616.

(Continued)

*Primary Examiner*—Kevin Hurley
(74) *Attorney, Agent, or Firm*—Norris McLaughlin & Marcus, PA

(57) ABSTRACT

The invention relates to a vehicle which can tilt in turns, and comprises a three-wheeled vehicle, which has a rear wheel (6) which is arranged on the longitudinal axis of the three-wheeled vehicle as well as two front wheels (3, 4) which are arranged at a distance from one another and can be steered indirectly by means of a steering element with intermediate connection of a steering column (2), wherein the two front wheels (3, 4) and the frame (1) of the three-wheeled vehicle can be inclined proportionally as a function of the direction of rotation of the steering column (2).

17 Claims, 3 Drawing Sheets

U.S. PATENT DOCUMENTS

Figure 1:
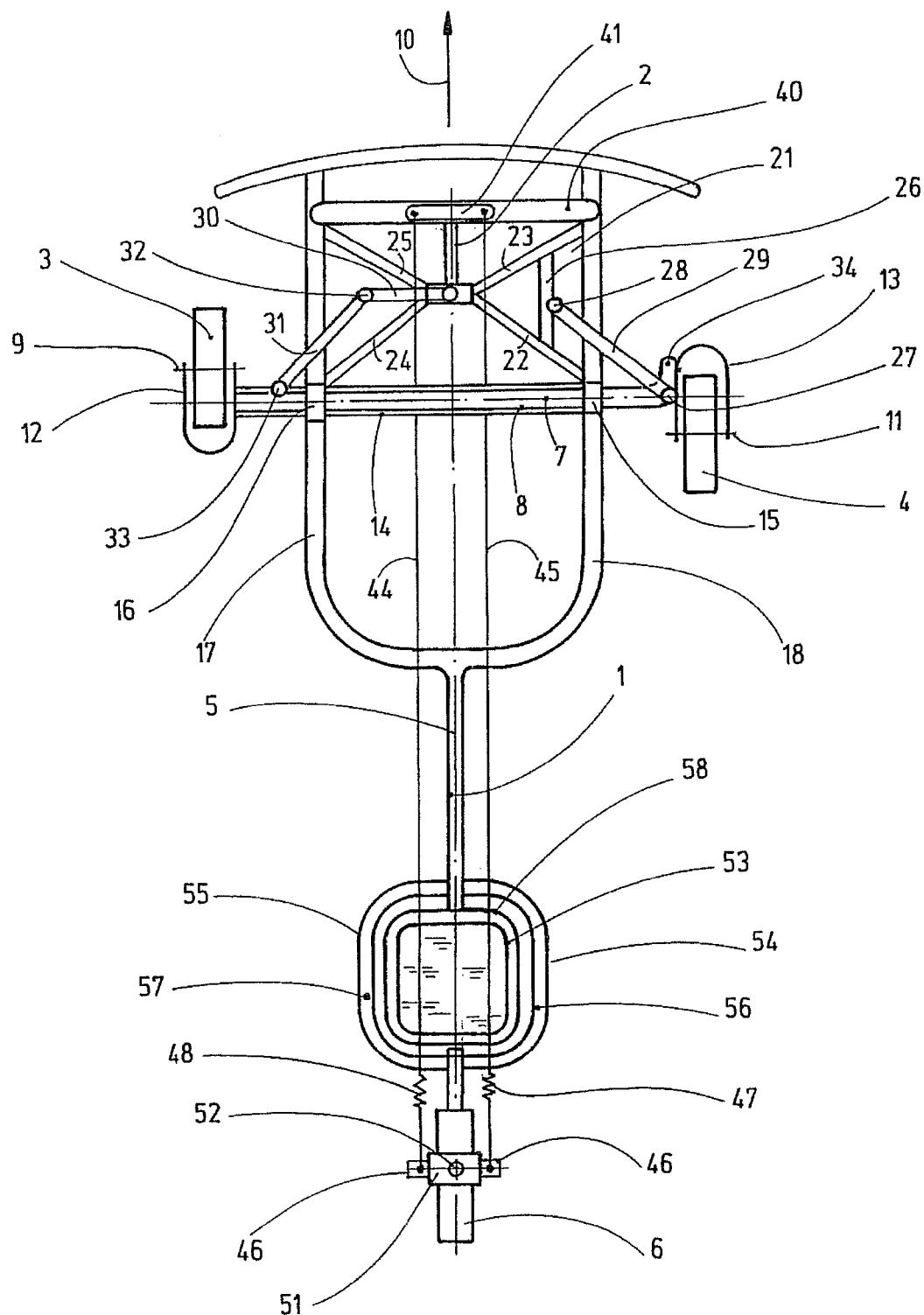

| | | | |
|---|---|---|---|
| 6,352,274 B1 * | 3/2002 | Redman | 280/248 |
| 6,402,174 B1 * | 6/2002 | Maurer | 280/267 |
| 6,581,947 B2 * | 6/2003 | Andrews et al. | 280/266 |
| 6,763,905 B2 * | 7/2004 | Cocco et al. | 180/210 |
| 6,817,617 B2 * | 11/2004 | Hayashi | 280/5.509 |
| 7,467,802 B2 * | 12/2008 | Peng et al. | 280/124.103 |
| 7,487,985 B1 * | 2/2009 | Mighell | 280/124.103 |
| 7,530,419 B2 * | 5/2009 | Brudeli | 180/210 |
| 7,543,829 B1 * | 6/2009 | Barnes | 280/62 |
| 7,591,337 B2 * | 9/2009 | Suhre et al. | 180/210 |
| 7,641,207 B2 * | 1/2010 | Yang | 280/124.103 |
| 7,665,749 B2 * | 2/2010 | Wilcox | 280/124.103 |

FOREIGN PATENT DOCUMENTS

| | | |
|---|---|---|
| EP | 1391374 A1 | 2/2004 |
| RU | 2140372 C1 | 10/1999 |

OTHER PUBLICATIONS

English Language Abstract for RU 2 140 372.

* cited by examiner

VEHICLE WHICH CAN TILT IN TURNS, IN PARTICULAR TRICYCLE

This application is a 371 application of PCT/EP2007/051350 filed Feb. 12, 2007, 2006, which claims priority to the German application DE 10 2006 007 613.3 filed Feb. 13, 2006, German application DE 10 2006 062 678.8 filed Dec. 28, 2006 and German application DE 20 2006 019 783.4 filed Dec. 28, 2006.

The invention is related to a vehicle which can tilt in turns, in particular a tricycle, with the features recited in the preamble of claim 1.

It is generally known to construct tricycles basically either with a single wheel in the front and two wheels arranged on an axle in the rear, or only with one rear wheel and two spaced front wheels. When considering a tricycle with two front wheels and one rear wheel, the two front wheels are connected with one another by a transverse rod as a steering element. The tricycle is driven by pedals which operate via a crank, for example, on a front toothed wheel, which is connected to a chain and a chain drive and operates on the rear wheel as a driven wheel. The seat associated with the tricycle is arranged essentially in the center between the two front wheels and the rear wheel and is associated with the frame of the tricycle. However, this embodiment of a tricycle is disadvantageously often not sufficiently safe in traffic, because the tricycle does not tilt into the turn like a normal bicycle, when driving through a turn.

Although different solutions are known to ensure safety in traffic, i.e., to allow the tricycle to tilt when negotiating a turn, these still do not satisfy the requirements. For example, for tilting in turns, actuating motors which have to be switched on and off by the driver may be associated with a tricycle. Additional switches are then required which not only make driving more difficult, but also make the structure of the tricycle more expensive because of the need for auxiliary energy. More significant is the unavoidable time delay before the switch is activated, but also the time delay between the time when the actuating motor is switched on and the respective required tilt is reached. This solution therefore also does not provide optimal safety in traffic, if the tilt commands are not timely transmitted by actuating the switch.

In addition, DE 102 49 616 A1 discloses a tricycle which tilts in turns, wherein in addition to a tilt, an additional pendulum function—similar to a balance—is to be attained between the frame of the tricycle and the road surface, so that the wheels are evenly loaded and adhere uniformly to the road when the road is uneven and when driving through turns. However, the tilt of the tricycle, in particular of the wheels, is also not optimal for ensuring safety in traffic, because the axle of this tricycle, with which the spaced wheels are associated, has a central straight axle element, with on one side with the first axle part being bent forward for supporting the corresponding associated wheel, and with the other side with the second axle part being bent backward for supporting the other corresponding associated wheel, so that these two wheels are arranged asymmetrically and have a parallel offset. The central axle element is here attached to the frame transversely with respect to the longitudinal axis of the tricycle and pivotally supported on the frame with respect to the longitudinal axis. The central axle element can be supported by torsion springs or resiliently supported only on one side.

It is an object of the invention to provide a vehicle which can tilt in turns, in particular a tricycle, with the features recited in the preamble of claim 1, wherein the tilt automatically adapts to the navigated turn without requiring auxiliary energy for a forced tilt or without significantly affecting the speed when driving through a turn, and which thereby significantly to improves the safety in traffic. A pendulum function, similar to a balance, is simultaneously provided between the frame of the tricycle and the road surface in order to adapt to uneven road conditions.

This object is attained with the invention by a vehicle which can tilt in turns, in particular a tricycle, with the features recited in the preamble of claim 1. By enabling the two spaced front wheels and therefore also the frame of the tricycle to tilt depending on the rotation direction of the steering column proportionally and thereby continually in response to the rotation angle resulting from the rotation of the steering column when negotiating a turn, by connecting the steering column, on one hand, with the axle element via a connecting rod, with a multifunctional axle positioned above the pivot bearing and associated with the axle element and arranged preferably above the axle element, which multifunctional axle is operatively connected together with the axle element and the wheel support of the wheel that is positioned in the travel direction in front of the axle of the axle element, and by connecting, on the other hand, a fixed point on the frame of the tricycle, which is preferably formed proximate of the bottom bracket ball bearing receptacle, via a second connecting rod with the wheel support of the wheel that is positioned in the travel direction after the axle of the axle element, wherein one or both wheel supports are pivotally connected with the axle element, the tricycle can adapt by assuming an individually selectable, adjustable tilt for a negotiated turn, without requiring auxiliary energy for a forced tilt and without significant impact on the speed when driving through a turn, so that the tricycle contributes significantly to improving safety in traffic. The pendulum function—similar to a balance—between the frame of the tricycle and the road surface ensures optimal adaptation to uneven road conditions.

According to an advantageous embodiment of the invention, the connecting rod connected with the axle element is operatively connected with the axle element and with a lever arranged on the steering column via ball and socket joints, wherein the axle element is operatively connected with the multifunctional axle via the pivot bearings, so that when driving through a left turn, the axle element on the side facing the wheel that is positioned in front of the axis of the axle element in the travel direction, can in response to a rotation of the steering column move rearward and simultaneously pivot downward, so that both the wheel and the frame can attain an outward tilt, wherein on the side facing the wheel both the axle element and also the multifunctional axle are connected with the wheel support that is connected with the wheel axle. In a non-motorized embodiment, the axle element and also the multifunctional axle are preferably connected—when viewed in the travel direction—in the rear region of the wheel support disposed after the wheel axle of the wheel in the travel direction.

To move the axle element rearward and simultaneously pivot the axle element downward in response to a corresponding rotation of the steering column when negotiating a left turn, two pivot bearings are preferably provided for operatively connecting the axle element and the multifunctional axle, wherein each of the pivot bearings is connected in one-to-one correspondence with a respective one of two spaced parallel tubes which form the forward region of the frame of the tricycle, wherein the pivot bearings are made from two components, of which a first component that is fixedly connected with the axle element is pivotally supported in the second component that is fixedly connected with the multifunctional axle and therefore also with one of the parallel tubes of the frame of the tricycle. With this arrangement of the pivot bearings, the frame is suspended in the pivot bearings, so that even in absence of a useful load and a nonpositive lock, the resting tricycle has a characteristic which forces the loaded tricycle more and more into the vertical direction.

According to another feature of the invention, the bottom bracket ball bearing receptacle connected to the frame of the tricycle, with the bottom bracket ball bearing positioned on top, is essentially made of four struts which form a rectangle and are also connected with the two spaced parallel tubes which form the forward region of the frame of the tricycle, wherein the two struts which are arranged on the side facing the wheel that is positioned with its wheel axle in the travel direction after the axle of the axle element, are connected with one another by a clamp, which according to an advantageous embodiment is connected with the wheel support associated with this wheel via the second connecting rod which is also supported in ball and socket joints. It will be understood that depending on the arrangement of the bottom bracket ball bearing, different configurations for the connecting rods supported in the ball and socket joints can be implemented.

Due to the fact that both connecting rods are supported in ball and socket joints, a relatively simple steering in both directions is attained, which optimizes steering also for tricycles.

To urge the wheel having a wheel axle positioned after the axis of the axle element in the travel direction, to assume an inward tilt, the axle element with the wheel support of the wheel, whose wheel axle is positioned in the travel direction after the axis of the axle element, is connected in the front with the wheel support, wherein for forming a connection with the wheel support the axle element is bent forward in the travel direction, so that in cooperation with the connecting rod, which is connected in the center region of the wheel support and supported in ball and socket joints, during a rotation of the steering column when negotiating a left turn, the resulting movement of the axle element stemming from the operation of the connecting rod, which is connected with the steering column by the lever and supported in ball and socket joints, on the axle element can be transmitted by the axle body in conjunction with the second connecting rod to the wheel support that is associated with the wheel positioned with its wheel axle in the travel direction after the axle of the axle element, so that this wheel can attain an inward tilt with when driving through a left turn.

If a right turn is negotiated, based on the embodiment of the invention of the tricycle capable of tilting in a turn, then it will be understood that for attaining the tilt of the two spaced front wheels for making the right turn, the axle element moves in the opposite direction with respect to the multifunctional axle, so that in cooperation with the connecting rods supported in the ball and socket bearings the wheels tilt in a direction opposite to the direction when negotiating a left turn. The effects intended by the invention are, of course, independent of the relative position of the wheels in the travel direction, i.e., which of the two spaced wheels is in front of the axle. However, it should be noted that both the wheel positioned before the axis of the axle element in the travel direction and the wheel positioned after the axis of the axle element in the travel direction have their own associated system in order to attain the proportional and also continuous tilt of the frame and wheels when turning the steering column for attaining an optimal steering geometry.

To reliably guide the movement of the axle element in response to the steering column operating on the axle element while negotiating a turn, the axle element has in the region of the longitudinal axle of the tricycle a disk segment which can be received in a slot formed as a caliper and connected with the two rear struts of the bottom bracket ball bearing receptacle and the frame, respectively, of the tricycle. The continuous nonpositive force transmission from the caliper of the tricycle, which is controlled by the manual turning handle of the tricycle and transmitted to the tilted disk segment of the asymmetric pendulum axle formed essentially by the axle element, provides a quick, continuously mixable start and stop tricycle characteristic, without requiring the driver to place his feet on the road surface. A separate caliper performs the function of a shimmy brake for the multifunctional axle and also for the single wheel.

In this embodiment of the tricycle capable of tilting in turns, the steering column is rotatably guided in a tube in the upper region of the bottom bracket ball bearing receptacle which is involved in providing the tilt in turns in which region the struts that form the bottom bracket ball bearing receptacle merge, whereas the steering column is preferably rotatably arranged in the lower region of the bottom bracket ball bearing receptacle in a bearing and fixed against longitudinal movement. The bearing is arranged in a web connected with the two spaced parallel tubes of the frame of the tricycle. The steering column has a steering lever, the respective ends of which are connected to a corresponding steering cable, wherein both steering cables are connected with a steering lever associated with the rear wheel or with a one-sided linkage assembly, and wherein the rear wheel attains a steering stop to the tilt when navigating a turn, which corresponds to that of the spaced front wheels. This enhances the steering geometry of the multifunctional axle.

For negotiating a turn, the rear wheel is advantageously pivotally supported on the frame of the tricycle. A tiltable wheel support constructed of two struts between which the rear wheel is rotatably arranged, is rotatably supported in a control head which is integrated in the frame of the tricycle by the two spring struts with two connecting webs. Other types of wheel suspensions are feasible.

The steering lever associated with the rear wheel is also connected to these two struts which are connected by the web and form the tiltable wheel support.

Alternatively, the wheel support receiving the rear wheel can, for example, also be constructed as a double-bridge fork or a spring fork, respectively, preferably in form of a telescope. In a motorized embodiment, the drive assembly is pivotally arranged with the driven wheel.

To further improve with the embodiment of the invention of the tricycle the safety of the driver by providing tilt in turns, two substantially U-shaped roll bars are preferably connected to the frame and arranged symmetrically with respect to the frame in the region of the seat of the tricycle, wherein their lower webs oriented outwardly. The roll bars also bound an underfloor load receptacle associated with the frame of the tricycle, which according to another advantageous embodiment of the tricycle is preferably arranged underneath the seat. The resulting useful load is also used to stabilize the vertical position of the tricycle.

To ensure use of the vehicle according to the invention capable of tilting and turns, in particular the tricycle, under rough conditions, several axle elements are provided which are movable and tiltable and connected with the multifunctional axle, and which are sequentially arranged and have different axle geometries. The same operating principle can be applied to other types of vehicles, for example scooters, sleds, go-carts, rickshaws and the like.

If the invention is applied to tricycles capable of tilting in turns, where the pedal cranks with their bottom bracket ball bearings are arranged in the front in relation to the travel direction, which corresponds, for example, to the co-called housewife model, the substantial overall length of the tricycle can be extended by a luggage receptacle, which is arranged in front of the front axle of the tricycle and has a relatively small spacing from the road surface.

It does not make a difference with the invention if the assembly which forms the wheel support for the rear wheel, for example of bicycles, incorporates an electric drive. Likewise, it makes no difference if an internal combustion engine or, for rail operation, a hydraulic drive is used. The advantages provided by the invention apply also to a tricycle capable of tilting in turns with one front wheel and two rear wheels.

The invention therefore provides a vehicle capable of tilting in turns, in particular a tricycle, wherein the asymmetric axle, which consists essentially of the movable and tiltable axle element operatively connected with the multifunctional axle and which is therefore a pendulum axle, changes through a pivoting motion the longitudinal dimensions for the wheel supports pivoted on one side or both sides, which assume a proper relationship with reference to the fixed point on the frame of the tricycle, which is preferably formed by the bottom bracket ball bearing receptacle.

Additional advantageous embodiments of the invention are recited as features in the other dependent claims.

An exemplary embodiment of the invention will now be described with reference to the appended drawings.

Figure 2:
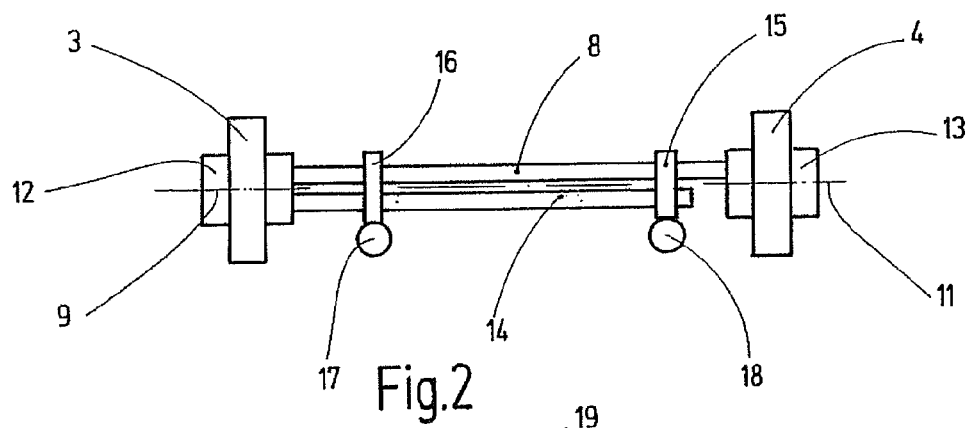
Figure 3:
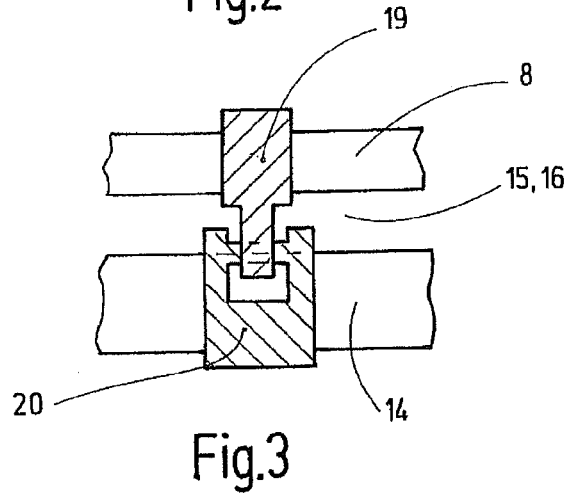
Figure 4:
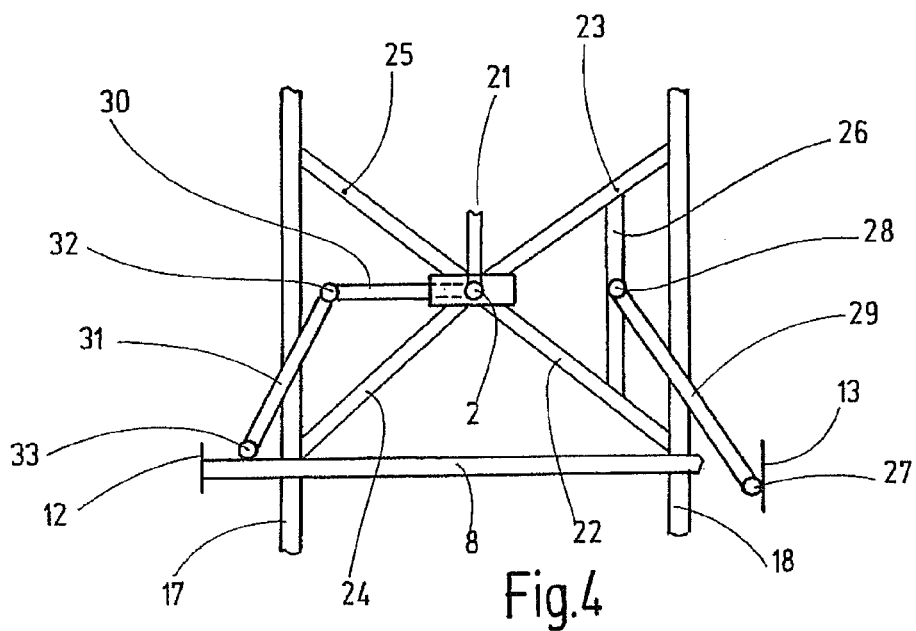
Figure 5:
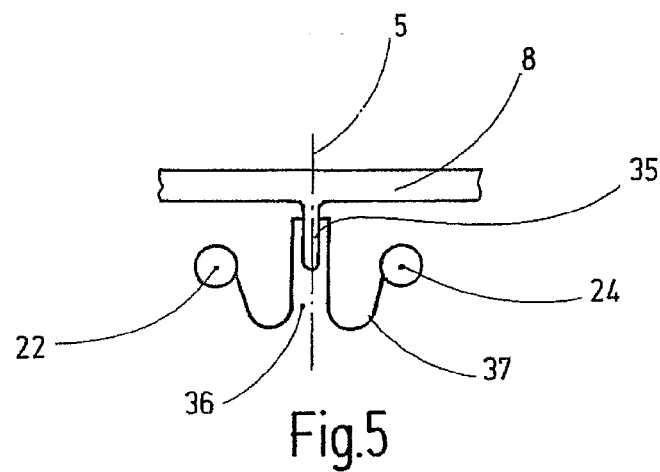
Figure 6:
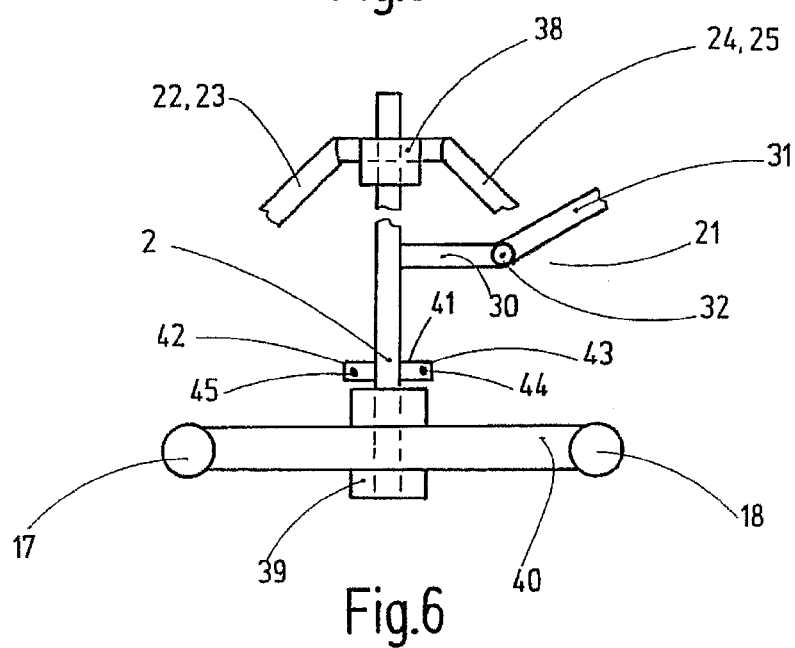
Figure 7:
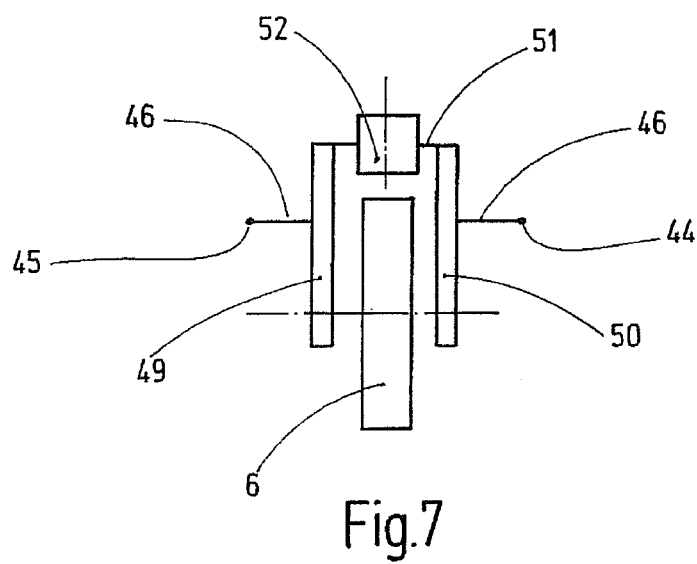

FIG. 1 shows a top view of the frame of a tricycle capable of tilting in turns with wheels associated with the frame, FIG. 2 shows a front view of the frame according to FIG. 1 in the region of the axle element associated with the frame, FIG. 3 shows a cross-section of a pivot bearing associated with the axle element of FIG. 2, FIG. 4 shows a top view of the bottom bracket ball bearing receptacle associated with the frame according to FIG. 1, with a bottom bracket ball bearing positioned below, FIG. 5 shows a top view of a guide segment associated with the axle element of FIG. 2, FIG. 6 is a schematic diagram of the guide for the steering column received by the bottom bracket ball bearing receptacle of FIG. 4, which can be adjusted over a wide range to adapt to the physical size of the driver, and FIG. 7 a schematic diagram of the guide for the rear wheel which is connected with the frame according to FIG. 1.

According to FIG. 1, two spaced front wheels 3, 4 which can be steered by way of a steering column 2 and a rear wheel 6 arranged in the longitudinal axis 5 of the tricycle are associated with the frame 1 of a tricycle capable of tilting in turns. The two spaced front wheels 3, 4 are arranged asymmetrically with a parallel offset with respect to the axis 7 of an axle element 8, so that one wheel 3 is arranged with its wheel axle 9 in front of the axis 7 of the axle element 8, as viewed in the travel direction 10, and the second wheel 4 is arranged with its wheel axle 11 after the axis 7 of the axle element 8, as viewed in the travel direction 10. Based on this arrangement of the front wheels 3, 4, these each have a wheel support 12, 13 in form of a front wheel fork, in which the wheels 3, 4 are rotatably supported by wheel axles 9, 11. While the wheel axle 9 of the wheel support 12 of the wheel 3 is arranged rearward with respect to the travel direction 10, the wheel axle 11 of the wheel support 13 of wheel 4 is arranged forward in the travel direction 10. As can be further seen from the combination of FIG. 2 with FIG. 1, a multifunctional axle 14 is provided below the axle element 8, which is operatively connected with the axle element 8, in that the axle element 8 is movable via pivot bearings 15, 16 relative to the multifunctional axle 14 and thereby also pivotally connected. Each of the pivot bearings 15, 16 is connected with a respective one of two spaced parallel tubes 17, 18, which form the forward region of tricycle frame 1. According to FIG. 3, each of the pivot bearings 15, 16 is formed of two components 19, 20, of which the one component 19 that is fixedly connected with the axle element 8 is pivotally supported in the second component 20 that is fixedly connected with the multifunctional axle 14.

It can also be seen from the combination of FIG. 1 with FIG. 4 that the steering column 2 is associated with a bottom bracket ball bearing receptacle 21 consisting of four struts 22, 23, 24, 25, which also connected with the two spaced parallel tubes 17, 18 that form the forward region of frame 1 of the tricycle, forming a rectangle. The two struts 22, 23 are connected with one another by a clamp 26 which is connected via a connecting rod 29 supported in the ball and socket joints 27, 28 with the wheel support 13 associated with the wheel 4 in the center region of the wheel support 13. Considering that the bottom bracket ball bearing receptacle 21 also receives the steering column 2, the steering column 2 also has a lever 30 which is connected via another connecting rod 31 with the axle element 8, wherein the connecting rod 31 is also connected with both the lever 30 and the axle element 8 through ball and socket joints 32, 33. Whereas both the axle element 8 and the multifunctional axle 14 are connected with the wheel support 12 of the wheel 3, the axle element 8, but not the multi-factional axle 14, is also connected with the wheel support 13 of the wheel 4 in addition to the connecting rod 29. The axle element 8 is bent forward in the travel direction 10 to connect the axle element with the wheel support 13 of the wheel 4.

For example, if based on the embodiment depicted in FIGS. 1 to 4 a left turn is to be negotiated, then during a rotation of the steering column 2 the axle element moves rearward on the side facing the wheel 3 by applying the lever 30 and therefore the connecting rod 31, whilst simultaneously performing a downward pivot motion. As a result, both the wheel 3, on which the axle element 8 operates via the wheel support 12, and the frame 1 tilt outwardly, whereby the tilt is proportional to the rotation angle resulting from the rotation of the steering column 2, which is continuous. From this movement caused by the connecting rod 31 which is connected with the steering column 2 via the lever 30, operating on the axle element 8 when negotiating a left turn, the movement is also transmitted through the axle element 8 with its bend 34 onto the wheel support 13 operated on by the connecting rod 29 and therefore transmitted to the wheel 4, so that the wheel tilts inward when negotiating a left turn, accompanied by a change in the longitudinal distance between the frame 1 and the wheel support 13. The axle element 8 is always reliably guided when moving, because—as illustrated in FIG. 5—the axle element 8 includes an additional disk segment 35 in the region of the longitudinal axis 5 of the tricycle. This disk segments 35 is received in a slot 36 formed by forming a caliper 37 which is connected with the two rear struts 22, 24 of the bottom bracket ball bearing receptacle 21.

As seen in FIG. 6, the steering column 2, which initiates a continuous tilt in the front wheels 3, 4 that is proportional to the respective rotation angle of the steering column 2, is guided in the bottom bracket ball bearing receptacle 21, which also receives the unillustrated, essentially conventional drive in form of pedals connected by a crank, inside a tube 38. The steering column 2 is also rotatably supported in the lower region of the bottom bracket ball bearing receptacle 21 in a bearing 39, which is arranged in a web 40 connected to the two parallel spaced tubes 17, 18 of the frame 1. The bearing 39 is also configured to prevent longitudinal movement of the steering column 2. FIG. 6 also shows that the steering column 2 has another steering lever 41 in addition to the lever 30, which is connected via the ball and socket joint 32 with the connecting rod 31. Respective steering cables 44, 45 are connected with corresponding ends of the steering lever 41, which are also connected by spring elements 47, 48 in form of tension springs with a steering lever 46 associated with the rear wheel 6, as shown in FIGS. 1 and 7. FIG. 7 also shows that the rear wheel 6 is rotatably arranged between two struts 49, 50 receiving the steering lever 46. The struts 49, 50 are connected at their respective top side by a web 51, which is rotatably positioned above a control head 52 which is integrated in the frame 1 (not illustrated) of the tricycle. It will be understood, that the rotatable arrangement of the rear wheel 6 can also be attained with a double-bridge fork or a spring fork in form of a telescopic fork or other types of suspensions, which are not illustrated.

To complete the frame of the tricycle capable of tilting in turns according to FIGS. 1 and 2, two roll bars 54, 55 are arranged in the region of the seat 53 symmetrically with respect to the frame 1 for enhancing the driver's safety. The web 56, 57 of the U-shaped roll bars 54, 55 is oriented outwardly. An underfloor load receptacle 58 is arranged underneath the seat 53 and bounded by the roll bars 54, 55.

LIST OF REFERENCE SYMBOLS 1 frame
2 steering column
3, 4 front wheels
5 longitudinal axis of the tricycle
6 rear wheel
7 axis
8 axle element
9, 11 wheel axles
10 travel direction
12, 13 wheel support
14 multifunctional axle
15, 16 pivot bearing
17, 18, 38 tubes
19, 20 components
21 bottom bracket ball bearing receptacle
22, 23, 24, 25, 49, 50 struts
26 clamp
27, 28, 32, 33 ball and socket joints
29, 31 connecting rods
30 lever
34 bend
35 disk segment
36 slot
37 caliper
39 bearing
40, 51, 56, 57 webs
41, 46 steering lever
42, 43 ends
44, 45 steering cables
47, 48 spring body for rotating the multifunctional axle
52 control head
53 seat
54, 55 roll bar
58 underfloor load receptacle

The invention claimed is:

1. A tricycle comprising a rear wheel (6) which is arranged in the longitudinal axis of the three-wheeled vehicle as well as two spaced front wheels (3, 4) which can be steered indirectly by a steering element via an intermediate steering column (2), wherein at least one wheel can be driven via a chain drive by operating pedals provided on a bottom bracket ball bearing receptacle (21) connected to the frame (1) of the tricycle, wherein the two spaced front wheels (3, 4) are attached to the axis of an axle element in such a way that these are offset with respect to one another relative to this axis, so that the one wheel with its wheel axle is positioned in front of the axis of the axle element in the travel direction (10) and the second wheel is positioned with its wheel axle after the axis of the axle element in the travel direction (10), wherein the two spaced front wheels (3, 4) and therefore also the frame (1) of the tricycle can be tilted depending on the rotation direction of the steering column (2) proportionally and thereby continually in response to the rotation angle resulting from the rotation of the steering column (2) when moving through a turn, in that the steering column (2) is, on one hand, connected with the axle element (8) via a connecting rod (31), with a multifunctional axle (14) positioned above the pivot bearing (15, 16) and attached to the axle element (8) and arranged above the axle element (8), which multifunctional axle (14) is operatively connected together with the axle element (8) and the wheel support (12) of the wheel (3) that is positioned in the travel direction (10) in front of the axle (7) of the axle element (8), and in that on the other hand, a fixed point on the frame (1) of the tricycle, which is formed proximate of the bottom bracket ball bearing receptacle (21), is connected via a second connecting rod (29) with the wheel support (13) of the wheel (4) that is positioned in the travel direction (10) after the axle (7) of the axle element (8), wherein one or both wheel supports (12, 13) are pivotally connected with the axle element (8).

2. The tricycle according to claim 1, wherein the connecting rod which is operatively connected to the axle element (8) is connected via ball and socket joints (32, 33) with the axle element (8) and with a lever (30) arranged on the steering column (2), wherein the axle element (8) is operatively connected with the multifunctional axle (14) via the pivot bearings (15, 16), so that during a rotation of the steering column (2) when driving through a left turn, the axle element (8) on the side facing the wheel (3) that is positioned in front of the axis (7) of the axle element (8) in the travel direction (10), can move rearward and simultaneously pivot downward, so that an outward tilt can be attained both with this wheel (3) and with the frame (1), wherein on the side facing the wheel (3) both the axle element (8) and also the multifunctional axle (14) are connected with the wheel support (12) that is connected with the wheel axle (9).

3. The tricycle according to claim 2, wherein both the axle element (8) and the multifunctional axle (14) are connected with respect to the travel direction (10) with rear region of the wheel support (12) that is arranged in the travel direction (10) behind the wheel axle (9) of the wheel (3).

4. The tricycle according to claim 3, wherein two pivot bearings (15, 16) are provided for operatively connecting the axle element (8) and the multifunctional axle (14), wherein each of the pivot bearings (15, 16) is connected in one-to-one correspondence with a respective one of two spaced parallel tubes (17, 18) which form the forward region of the frame (1) of the tricycle, wherein the pivot bearings (16, 17) are made from two components (19, 20), of which a first component (19) fixedly connected with the axle element (8) is pivotally supported in the second component (20) that is fixedly connected with the multifunctional axle (14).

5. The tricycle according to claim 4, wherein the bottom bracket ball bearing receptacle (21) connected to the frame (1) of the tricycle is essentially made of four struts (22, 23, 24, 25) forming a rectangle and is also connected with the two spaced parallel tubes (17, 18) which form the forward region of the frame (1) of the tricycle, wherein the two struts (22, 23) which are arranged on the side facing the wheel (4) that is positioned with its wheel axle (11) in the travel direction (10) behind the axle (7) of the axle element (8), are connected with one another by a clamp (26) that is connected with the wheel support (13) attached to this wheel (4) via the second connecting rod (29) which is also supported in ball and socket joints (27, 28).

6. The tricycle according to claim 5, wherein the connecting rod (29) supported in ball and socket joints (27, 28) is connected with the wheel support (13) in the center region of the wheel support (13).

7. The tricycle according to claim 6, wherein the axle element (8) with the wheel support (13) of the wheel (4), whose wheel axle (11) is positioned in the travel direction (10) after the axis (7) of the axle element (8), is connected in the front with the wheel support (13), wherein for forming a connection with the wheel support (13) the axle element (8) is bent forward in the travel direction (10), so that in cooperation with the connecting rod (29), which is connected in the center region of the wheel support (13) and supported in ball and socket joints (27, 28), during a rotation of the steering column (2) when driving through a left turn, the resulting movement of the axle element (8) stemming from the operation of the connecting rod (31), which is connected with the steering column (2) by the lever (3) and supported in ball and socket joints (32, 33), on the axle element (8) can be transmitted by the axle body (8) in conjunction with the second connecting rod (29) to the wheel support (13) that is attached to the wheel (4) positioned with its wheel axle (8) in the travel direction (1) after the axle (7) of the axle element (8), so that an inward tilt can be attained with this wheel (4) when driving through a left turn.

8. The tricycle according to claim 7, wherein the axle element (8) has in the region of the longitudinal axle (5) of the vehicle a disk segment (35) which can be received by a slot (36) which is formed as a caliper (37) that is connected with the two rearward struts (22, 24) of the bottom bracket ball bearing receptacle (21) and the frame (1), respectively, of the tricycle.

9. The tricycle according to claim 8, wherein the steering column (2) is rotatably guided in a tube (3) in the upper region of the bottom bracket ball bearing receptacle (21) where the struts (22, 23, 24, 25) that form the bottom bracket ball bearing receptacle (21) merge, whereas the steering column (2) is rotatably arranged in the lower region of the bottom bracket ball bearing receptacle (21) in a bearing (39) and fixed against longitudinal movement, which bearing (39) is arranged in a web (40) that is connected with the two spaced parallel tubes (17, 18) of the frame (1) of the tricycle.

10. The tricycle according to claim 9, wherein the steering column (2) has a steering lever (41) with two ends (42, 43) which are each connected with a respective steering cable (44, 45), wherein both steering cables (44, 45) are connected with a steering lever (46) associated with the rear wheel (6) and wherein, when driving through a turn, the rear wheel (6) also attains a steering stop with respect to the tilt which corresponds to the tilt of the two spaced front wheels (3, 4).

11. The tricycle according to claim 10, wherein the rear wheel (6) is pivotally supported on the frame (1) of the tricycle to adapt to driving through a turn, wherein a tiltable wheel support made of two struts (49, 50) between which the rear wheel (6) is arranged for a rotation, is rotatably arranged in a control head (52) integrated in the frame (1) of the tricycle by way of a web (51) which connects the two struts (49, 50) at their top sides.

12. The tricycle according to claim 11, wherein the steering lever (46) attached with the rear wheel (6) is connected with the two struts (49, 50) which are connected by the web, the cables or linkage (51) and form the tiltable wheel support.

13. The tricycle according to claim 1, wherein the wheel support which rotatably receives the rear wheel (6) is made of a double-bridge fork and/or a spring fork, in the form of a spring element.

14. The tricycle according to claim 1, wherein two roll bars (54, 55) are connected to the frame (1) and arranged symmetrically with respect to the frame (1) in the region of the seat (53) of the tricycle, with the two roll bars (54, 55) having substantially a U-shape, wherein their web (56, 57 oriented outwardly.

15. The tricycle according to claim 14, wherein the frame (1) of the tricycle has an underfloor load receptacle (58), which is arranged underneath the seat (53) and bounded by the roll bars (54, 55).

16. The tricycle according to claim 1, wherein several axle elements (8) are provided which are movable and tiltable and connected with the multifunctional axle (14), which are sequentially arranged and have different axle geometries.

17. The tricycle according to claim 1, wherein the pedal cranks with their bottom bracket ball bearings are arranged in the front in relation to the travel direction (10), the substantial overall length of the tricycle is extended by a luggage receptacle and/or a child seat behind the driver, which is arranged in front of the front axle of the tricycle and has a relatively small spacing from the road surface.

* * * * *